United States Patent

Yoshino et al.

[11] 4,394,077
[45] Jul. 19, 1983

[54] DEVICE FOR DETECTING SHARP FOCUSING

[75] Inventors: Tsunemi Yoshino, Ibaraki; Toshitsugu Kashihara; Hiroshi Iwata, both of Nara; Akitoshi Morioka, Osaka, all of Japan

[73] Assignee: West Electric Co., Ltd., Osaka, Japan

[21] Appl. No.: 313,668

[22] Filed: Oct. 21, 1981

[30] Foreign Application Priority Data

Oct. 27, 1980 [JP] Japan .................................. 55-150527

[51] Int. Cl.³ ........................ G03B 13/18; G03B 15/05
[52] U.S. Cl. ........................................ 354/25; 354/59; 354/145
[58] Field of Search ................. 354/25 A, 25 R, 56, 354/35, 126, 145, 59, 165, 195; 350/19, 46; 352/140

[56] References Cited

U.S. PATENT DOCUMENTS

| | | | |
|---|---|---|---|
| 3,836,919 | 9/1974 | Matsumoto et al. | 354/25 A |
| 4,067,030 | 1/1978 | Kuramoto et al. | 354/165 X |
| 4,150,888 | 4/1979 | Filipouich | 354/25 |

*Primary Examiner*—William B. Perkey
*Attorney, Agent, or Firm*—Burgess, Ryan and Wayne

[57] ABSTRACT

Image focusing device especially adapted for use in single-lens reflex cameras. A light-beam emission or projection means is incorporated in each interchangeable photographic lens in such a way that the direction of the light beam emitted or projected therefrom can be varied in response to the axial displacement of a lens group for focusing an object. The light rays which are reflected from the object and pass through the photographic lens along and in the vicinity of its optical axis are intercepted by a photodetection means disposed within a camera body, whereby whether or not the photographic lens is sharply focused at the object can be detected.

8 Claims, 9 Drawing Figures

DEVICE FOR DETECTING SHARP FOCUSING

BACKGROUND OF THE INVENTION

The present invention relates to a device for detecting sharp focusing through an optical focusing means such as a photographic lens on a predetermined plane such as a film plane. (The device shall be referred to as "an image focusing device" in this specification for brevity.)

Various types of image focusing systems utilizing photodetectors for sharply focusing a photographic lens at an object have been devised and demonstrated. In the case of single-lens reflex cameras which can interchangeably use various photographic lenses, an image focusing system which detects the state of the image of an object focused through a photographic lens upon a film plane has been widely used. This system can be further divided into various sub-systems. For instance, in one sub-system how sharply the image is being focused is detected; in another sub-system, split image prisms are used so that the sharpness of focus can be detected in terms of the degree of coincidence of the split images; and in a further sub-system, a slit or a micro-lens group is used to detect the sharpness of focus in terms of the phase difference of the focused light rays.

These sub-systems have some common defects. First, it is difficult to detect if a photographic lens is sharply focused at an object if the latter is dark or if the contrast thereof with its background is vague. Furthermore, they use a plurality of photodetectors arranged in a predetermined array so that the fabrication costs are high. Furthermore, they must use complex circuits for processing the output from the photodetectors, which also contributes to an increase in fabrication cost.

There has been devised and demonstrated an image focusing system to solve these problems. In this system, a light beam is emitted from a camera to an object and the light reflected from the object is intercepted to determine if the image of the object is sharply focused or not. However, if this system is applied to the single-lens reflex camera, the relative position between a light-beam emission or projection means and a photodetection means and the control of the light-beam emission or projection means must be varied depending upon the types of interchangeable photographic lenses used. As a consequence, there has not been available a single-lens reflex camera incorporating the image focusing system of the type described.

SUMMARY OF THE INVENTION

One of the objects of the present invention is, therefore, to provide a light-beam projection type image focusing device which is especially adapted for use in single-lens reflex cameras capable of using various types of interchangeable lenses.

Briefly stated, according to the present invention, a light-beam projection means for projecting the light beam toward an object to be focused is incorporated in a photographic lens in such a way that the angle (with respect to the optical axis of the photographic lens) of the light beam can be varied in response to the axial displacement of the lens group. The light reflected back from the object is intercepted by a photodetection means disposed within a camera body so that sharp focus of the image of the object is detected.

The above and other objects, effects and features of the present invention will become more apparent from the description of preferred embodiments thereof taken in conjunction with the accompanying drawings.

DESCRIPTION OF THE PERFERRED EMBODIMENTS

Figure 1:
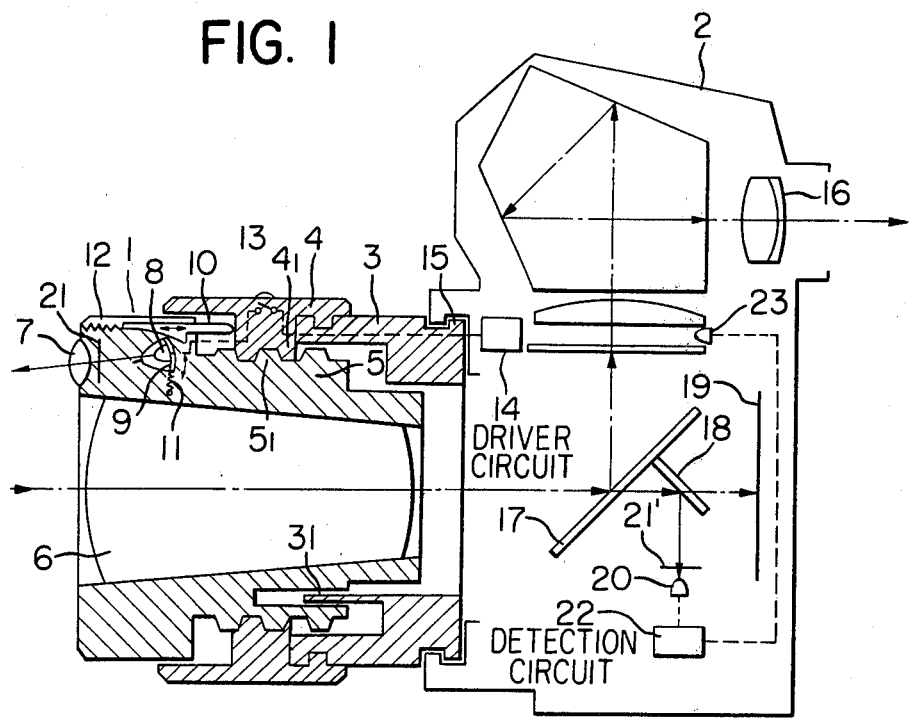
FIG. 1 is a schematic view of a first embodiment of the present invention.

In FIG. 1 is shown in schematic view a first embodiment of the present invention. A photographic lens generally indicated by the reference numeral 1 comprises a stationary barrel 3 which is mounted on a camera body 2 and maintained stationary, a focusing ring 4 which is rotatably fitted over the stationary barrel 3, and an inner barrel 5 which has the screw threads $5_1$ in mesh with multiple screw threads $4_1$ of the focusing ring 4 and which securely holds a group of lenses 6. Upon rotation of the focusing ring 4, the inner barrel 5 and hence the lens group 6 are guided by a straight key $3_1$ of the stationary barrel 3 and straightly displaced within the stationary barrel 3 as is well known in the art.

Mounted in the inner barrel 5 is a range-finding objective lens 7 whose optical axis is contained in the same plane containing the optical axis of the lens group 6. A light-emitting element 8 is securely mounted on a movable mount 9 which is located behind the objective lens 7 and is movable together with a sensing pin 10, which is adapted to sense or detect the displacement of the lens group 6, under the forces of compression springs 11 and 12 in the direction perpendicular to the optical axis of the lens group 6 in unison with the displacement thereof.

The sensing pin 10 detects the displacement of the lens group 6 as described above. That is, it detects the displacement of the lens group 6 in terms of the distance between the inner barrel 5, which is axially movable, and the focusing ring 4. The contact surfaces between the sensing pin 10 and the movable mount 9, upon which is mounted the light-emitting element 8, are curved so that the movable mount 9 can be displaced in unison with the displacement of the lens group 6 by a distance in proportion thereof. The curvature or shape of the curved contact surfaces is so determined that the displacement of the sensing pin 10 is proportional to the focal length of the photographic lens 1. To put it another way, the displacement of the sensing pin 10 varies depending upon the focal length of a photographic lens used even when the photographic lens is displaced by the same distance.

The focusing ring 4 is provided with a switch 13 such as a "push-on" or "touch-on" switch which is extended out of the cylindrical outside surface of the focusing ring 4 so that an operator can turn it on or off by finger, thereby turning on the light-emitting element 8. More specifically, when the switch 13 is closed, a driver circuit 14 mounted in the camera body 2 transmits the signal to the light-emitting element 8 through electrical contacts 15 between the camera body 2 and the stationary barrel 3.

A deviating or main mirror 17 in the camera body 2 redirects the light rays from an object to a viewfinder 16 so that the image of the object can be focused in the viewfinder 16. A predetermined area centered around the optical axis of the deviating or main mirror 17 is made semi-transparent so that the light rays from the object can be also redirected by an auxiliary mirror 18 and focused upon a light sensor 20 which is located at the position spaced apart from the main mirror 17 by the same distance between the mirror and the film plane 19.

The light-emitting element 8 can emit infrared, ultraviolet or other rays at any suitable wavelength. Therefore, the light-emitting element 8 is a light source. According to the first embodiment, a filter 21 is disposed in front of the light-emitting element 8 so that light at desired wavelengths can be emitted. Therefore, a color filter 21' substantially similar in color absorption capability to the filter 21 is disposed in front of the light sensor 20.

Figure 2:
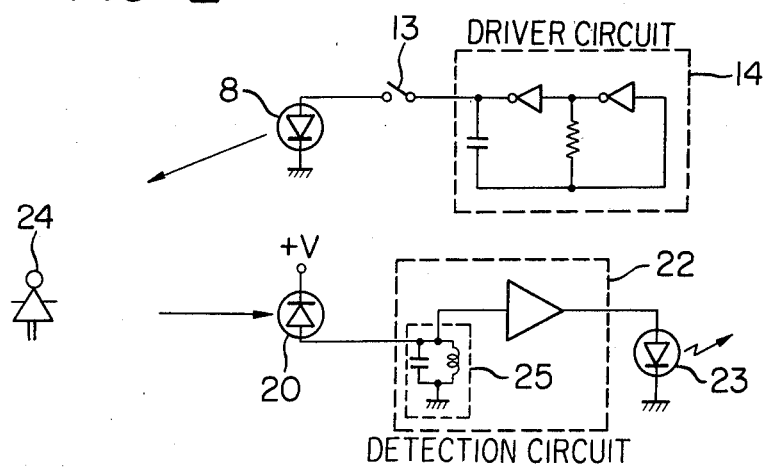
FIG. 2 is a diagram of an electronic circuit thereof.

Next, the mode of operation of the first embodiment will be described. As described previously, the photographic lens 1 has the ability of transmitting the light beam to an object so as to measure the distance. When the operator rotates the focusing ring 4, the switch 13 (See FIG. 2) is closed so that the driver circuit 14 in the camera body is activated. An oscillator in the circuit 14 generates the signal of a predetermined frequency which in turn is applied through the electrical contacts 15 and the closed switch 13 to the light-emitting element 8. The light-emitting element 8 is turned on to emit the light which is transmitted through the color filter 21 and the lens 7 to the object 24.

The light-beam emitting angle of the lens 7 and the light-beam reception angle of the light sensor 20 are so selected that only the light beam reflected from the object 24 when the latter is at the point at which the axis of the transmitted light beam intersects the optical axis of the lens group 6 is returned and received by the photo sensor 20. The angle of the light beam with respect to the optical axis of the lens group 6 is varied as the focusing ring 4 is rotated so that the lens group 6 is displaced axially and consequently the movable mount 9 upon which is mounted the light-emitting element 8 is displaced. It follows, therefore, that when the light reflected back from the object 24 is received by the light sensor 20, the lens group 6 is displaced at the position at which the object 24 is sharply focused through the lens group 6 upon the film plane.

When the light beam which is transmitted from the light-emitting element 8 through the color filter 21 and the lens 7 is reflected back from the object 24 and impinges through the color filter 21' upon the photo sensor 20, a tuning circuit 25 in a detection circuit 22 responds to the received light beam whose flash frequency is of the order of from hundreds Hz to one kHz. Then, the detection circuit 22 generates the output signal in response to which a light-emitting diode 23 is turned on. The light-beam flash frequency; that is, the switching frequency of the light-emitting element 8 can be selected suitably depending upon various factors.

When the photo sensor 20 receives no reflected light beam, the light-emitting diode 23 of course remains turned off so that the operator must continue the focusing operation by rotating the focusing ring 4.

As described previously, in unison with the displacement of the inner barrel 5 which is caused by the rotation of the focusing ring 4, the position of the sensing pin 10 relative to the inner barrel 5 varies so that the light-emitting element 8 which is mounted on the movable mount 9 is displaced in the direction indicated by an arrow against the bias springs 11 and 12. As a result, the angle of the light beam with respect to the optical axis of the lens group 6 emitted from the element 8 can be varied. When the focusing ring 4 is so rotated that the light beam thus emitted is incident on the object 24, the light reflected back therefrom impinges on the photo sensor 20 and consequently the light-emitting diode 23 is turned on as described previously.

In summary, according to the first embodiment of the present invention, in response to the displacement of the lens group 6, the light emission angle of the light-emitting element 8 is varied. The photo or light sensor 20 is disposed in the camera body 2 at such a position along the optical axis of the lens group 6 that the sensor 20 will not interfere with the formation of the image of an object on the film plane. In addition, the sensitivity of the photo sensor 20 is so selected that it responds only to the light beam emitted from the light-emitting element 8. When the focusing ring 4 is so rotated that the lens group 6 is brought to the position at which the image of an object is sharply focused on the film plane through the lens group 6, the light reflected from the object impinges on the light sensor 20 so that the light-emitting diode 23 is turned on. Thus, the present invention provides single-reflex cameras capable of using interchangeable lenses with the automatic focusing capability which is highly valuable in practice.

Figure 3:
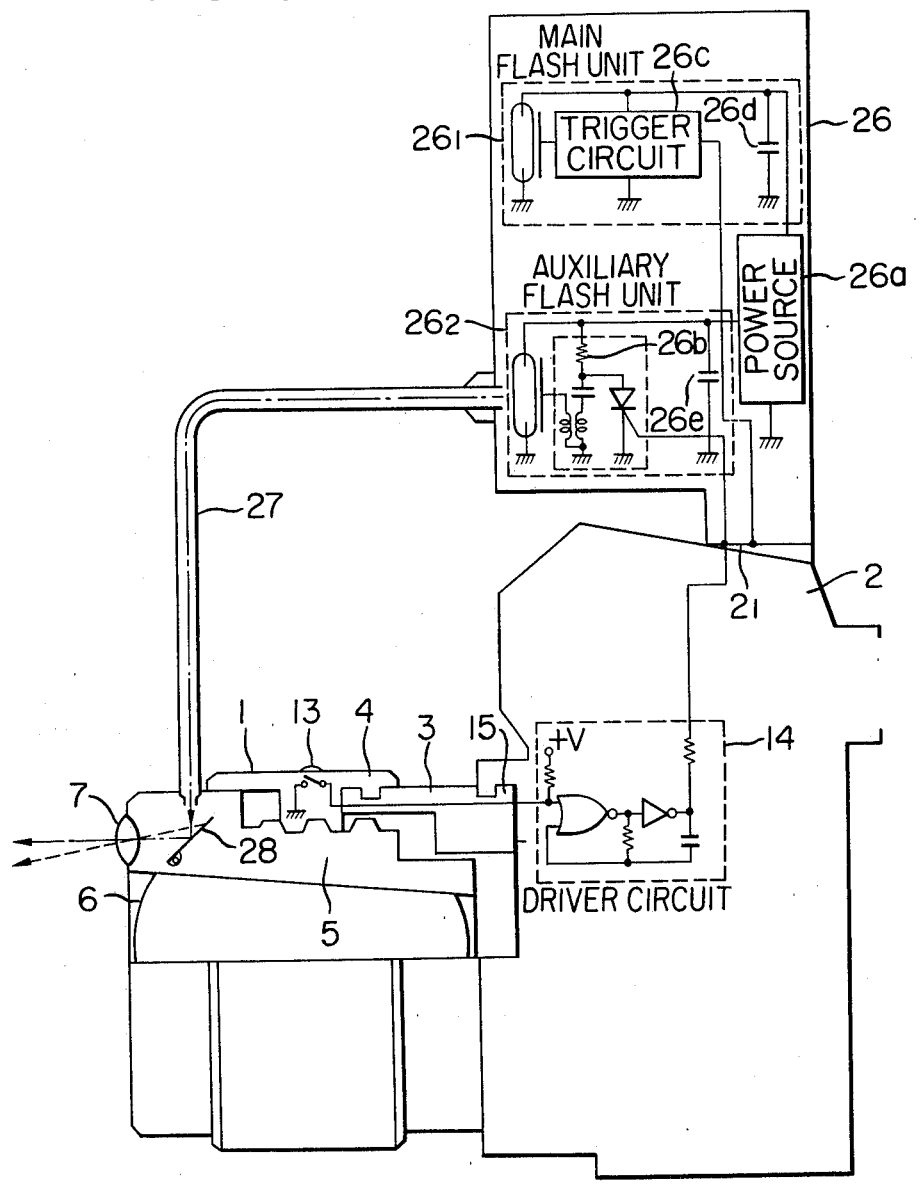
FIG. 3 is a schematic view of a second embodiment of the present invention.

In FIG. 3 is shown in schematic diagram a second embodiment of the present invention. While the light-emitting element 8 is used as a light source in the first embodiment, the second embodiment uses an electronic flash device as a light source for focusing an object.

In the case of the single-lens reflex camera, one can focus the image of an object on the ground-glass or in a prism viewfinder. Therefore, when an object is sufficiently bright, no automatic focusing means or the like is needed, but if an object is dark, it becomes difficult to sharply focus the image on the ground-glass screen or in the prism viewfinder. As a consequence, an auxiliary light source must be provided.

According to the second embodiment of the present invention, used as a light source for focusing is an electronic flash device which is used almost without exception when an object is so dark that it becomes difficult to obtain an optimum exposure.

As shown in FIG. 3, an electronic flash device generally indicated by the reference numeral 26 comprises a main flash unit $26_1$ and an auxiliary flash unit $26_2$. Light emitted from the auxiliary flash unit $26_2$ is transmitted through a light transmission medium 27 such as an optical fiber or an optical waveguide to a reflecting mirror 28 which in turn is mounted in the photographic lens 1. As with the case of the light-emitting element 8 of the first embodiment, the reflecting mirror 28 is so designed and constructed that it can rotate about a predetermined axis through an angle in proportion to the displacement of the lens group 6. Therefore, the light beam transmitted from the auxiliary flash unit $26_2$ can be redirected by the reflecting mirror 28 to an object.

In order to operatively interlock the displacement of the lens group 6 with the rotation of the reflecting mirror 28, the mechanism for interlocking between the lens group 6 and the movable mount 9 upon which is mounted the light-emitting element 8 can be used. Therefore, no further description thereof shall be made.

When one rotates the focusing ring 4, he or she closes the switch 13 if the automatic focusing is needed. The driver circuit 14 in the camera body 2 is energized in a manner substantially similar to that described previously so that the control signal is transmitted via a "hot" shoe 2 to the electronic flash device 26. The frequency of the control signal is determined by an oscillator in the driver circuit 14.

The electronic flash device 26 includes a power source 26a and a trigger circuit 26b in the auxiliary flash unit $26_2$. In response to the control signal from the driver circuit 14, the trigger circuit 26b is activated or starts oscillating at a predetermined frequency so that an auxiliary flash lamp is flashed or fired at a predetermined flash frequency of the order of from hundreds Hz to 1 kHz.

The flash light is then transmitted through the optical transmission medium 27, redirected by the reflecting mirror 28 and projected through the objective lens 7 to the object. The light reflected back from the object is received by the light sensor 20 and the light-emitting diode 23 is turned on when the object is sharply focused in the manner described previously with reference to FIGS. 1 and 2.

The electronic flash device 26 includes, in addition to the component parts described above, a trigger circuit 26c for firing a main electronic flash lamp and main flash capacitors 26d and 26e for the main and auxiliary flash lamps, respectively. It is, of course, possible to use the main flash lamp instead of the auxiliary flash lamp for focusing an object in a manner substantially similar to that described above.

Figure 4A:
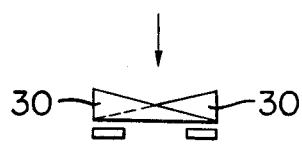
FIG. 4A is a side view of a photodetection means used in the present invention.
Figure 4B:
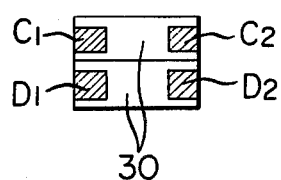
FIG. 4B is a bottom view thereof.

In FIGS. 4A and 4B is shown a photodetector which is used in the present invention in order to attain a higher degree of accuracy in focusing. It is unavoidable that the light beam incident on an object has some cross sectional area. Same is true for the light beam which is reflected back from the object and impinges upon the photodetector.

Figure 5A:
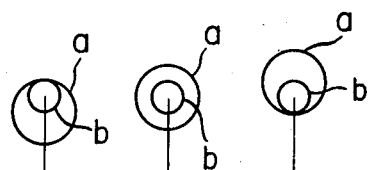
FIGS. 5A, 5B and 6 are views used to explain the mode of operation thereof.
Figure 5B:
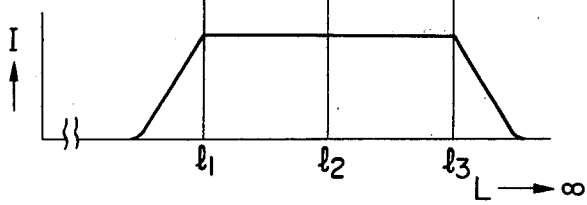

In FIG. 5A, a circle indicated by a shows the cross sectional area of the light beam incident upon an object; and a circle b, the cross sectional area of the light beam which is reflected back from the object and impinges on the light sensor 20. The distance-to-object or -subject is plotted along the abscissa. It is assumed that the object can be most sharply focused at the distance $l_2$. In practice, the output from the photodetector remains same in level between $l_1$ and $l_3$. As a consequence, the image is out of focus at a relatively small aperture number at which the depth of field is rather short.

Figure 4C:
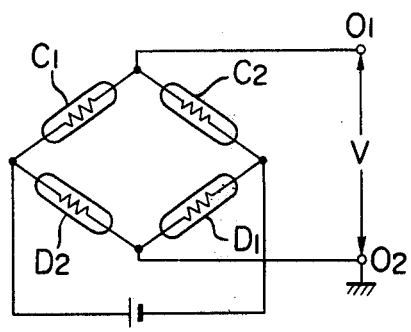
FIG 4C shows the electrical connection of photodetector elements thereof.
Figure 6:
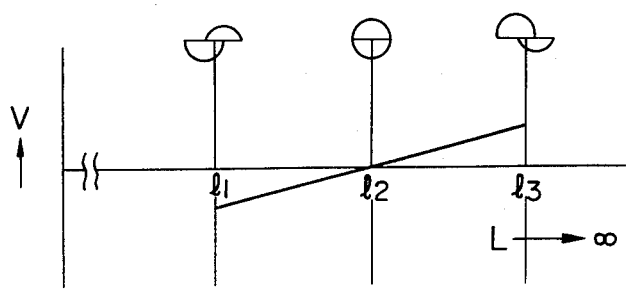

The light sensors of the present invention as shown in FIG. 4 can substantially solve this problem as will be described in detail below. Focusing plates 30 such as prisms adapted to form a split image are disposed on the plane equivalent to the film plane. Photosensors $c_1$, $c_2$, $d_1$ and $d_2$ are disposed behind the focusing plates 30 in symmetrical relationships as shown about the axis along which the image of the object is split. These photosensors are connected in bridge as shown in FIG. 4C. With this arrangement, the detection characteristic as shown in FIG. 6 can be obtained. That is, a higher degree of focusing accuracy can be ensured.

That is, when the object at the distance $l_2$ from the lens group 6 is sharply focused, the circles a and b are concentric as shown in FIG. 5A and the center of the circular cross section of the reflected light beam which impinges on the light sensor device coincides with the boundary line (the horizontal straight line in FIG. 4B) between the focusing plates or prisms 30. As a consequence, the amount of light which the upper pair of light sensors $C_1$ and $C_2$ receives becomes equal to that which the lower pair $D_1$ and $D_2$ receives so that the voltage difference between the terminals $O_1$ and $O_2$ (See FIG. 4C) becomes zero. However, if the photographic lens 1 is focused at the point other than the point at the distance $l_2$, the quantity of light which the upper pair receives becomes different from that which the lower pair receives so that there exists a potential difference between the terminals $O_1$ and $O_2$. Thus, whether or not the photographic lens 1 or the lens group 6 is correctly focused at the point $l_2$ can be clearly and easily detected and the image of the object can be sharply focused on the film plane.

In summary, according to the present invention, a light-beam projection means is incorporated in a photographic lens in such a way that in response to the focusing operation or the displacement of the lens group, the light-beam projection means can change the direction of the light beam. Therefore, regardless of the brightness and contrast of an object, the automatic focusing can be accomplished. In addition, the driver circuit for driving the light-beam projection means and a photodetection means are incorporated within the camera body. Therefore, when the present invention is applied to the single-lens reflex camera, it only suffices to provide interchangeable lenses with light-beam emitting means of the types described above. Thus, the present invention can provide the image focusing devices which are very simple in construction yet highly reliable in operation.

What is claimed is:

1. An image focusing device characterized by comprising
   a light beam projection means which is disposed within a photographic lens, whose optical axis is contained in the same plane which contains the optical axis of said photographic lens and which can project the light beam toward an object,
   a lens-group displacement detection means which is disposed within said photographic lens and which can respond to the axial displacement of said photographic lens for focusing the object so as to cause said light-beam projection means to change the light-beam projection direction,
   a photodetection means which is disposed within a camera body at such a position spaced apart from a main mirror by the same distance between the mirror and the film plane at which said photodetection means can intercept the light beam passing through said photographic lens along the optical axis thereof and at which said photodetection means will not interfere with the formation of the image of the object through said photographic lens upon a film plane,
   a driver-control means which includes an actuating switch and which, upon closure of said actuating switch, can drive said light-beam projection means, and
   a detection circuit which drives a display means responding to the output from said photodetection means to detect whether or not said photographic lens is sharply and correctly focused at the object.

2. An image focusing device as set forth in claim 1 further characterized in that
said light-beam projection means comprises
a light source,
a first optical filter which is disposed in front of said light source so that light at predetermined wavelengths passes through said first optical filter, and
a projection lens which is disposed in front of said first optical filter for controlling the converging angle of the light beam projection; and
said photodetection means comprises
a second optical filter which is substantially similar in optical property to said first optical filter, and
one or more photodetection elements which are so disposed as to intercept the light passed through said second optical filter.

3. An image focusing device as set forth in claim 1 further characterized in that
said driver-control means includes an oscillator which oscillates at a predetermined frequency at which the light beam projected from said light-beam projection means is flashed; and
said detection circuit includes a tuning circuit which responds at said predetermined frequency.

4. An image focusing device as set forth in claim 1 further characterized in that said actuating switch is extended out of the cylindrical outside wall of a focusing ring of said photographic lens and is adapted to be closed when said focusing ring is operated.

5. An image focusing device as set forth in claim 1 further characterized in that
said photodetection means comprises
focusing plates, and
two pairs of photodetection elements disposed behind said focusing plates, respectively, and electrically so connected as to provide a bridge circuit.

6. An image focusing device which comprises:
a light-beam projection means comprising an auxiliary flash unit which is incorporated in an electronic flash device having a main flash unit comprising a power supply, a first main flash capacitor, a first electronic flash lamp and a first trigger circuit, said auxiliary flash unit comprising said power supply, a second main flash capacitor, a second trigger circuit and a second electronic flash lamp;
an optical transmission means for transmitting light emitted from said auxiliary flash unit into said photographic lens; and
a reflecting mirror which is disposed to redirect the light emitted from said auxiliary flash unit through said optical transmission means toward the object, the angular position of said reflecting mirror being controlled in response to the output from said lens-group displacement detection means,
a photodetection means which is disposed within a camera body at such a position spaced apart from a main mirror by the same distance between the mirror and the film plane at which said photodetection means can intercept the light beam passing through said photographic lens along the optical axis thereof and at which said photodetection means will not interfere with the formation of the image of the object through said photographic lens upon a film plane,
a driver-control means which includes an actuating switch and which, upon closure of said actuating switch, can drive said light-beam projection means, and
a detection circuit which drives a display means responding to the output from said photodetection means to detect whether or not said photographic lens is sharply and correctly focused at the object.

7. An image focusing device as set forth in claim 1 or 6 further characterized in that
said lens-group displacement detection means comprises
(a) a movable mount upon which is mounted or to which is operatively coupled said light-beam projection means and which is disposed in an inner barrel of said photographic lens in which is mounted a lens group and which is movable along the optical axis of said photographic lens, said movable mount being angularly movable in the plane containing the optical axis of said photographic lens, whereby the direction of the light beam projected from said light-beam projection means relative to the optical axis thereof can be varied;
(b) a sensing pin which is disposed within said inner barrel for movement in the direction in parallel with the optical axis thereof so as to detect the axial displacement of said inner barrel, one end of said sensing pin being contacted to a focusing ring of said photographic lens which controls the axial displacement of said inner barrel while the curved surface of said sensing pin is terminated to a curved surface and made into contact with a predetermined portion of said movable mount;
a first biasing means for maintaining normally the contact between said predetermined portion of said movable mount and a curved surface of said sensing pin; and
a second biasing means for normally maintaining the contact between said sensing pin and said focusing ring,
whereby the axial displacement of said sensing pin in unison with or in response to the axial displacement of said inner barrel causes the angular displacement of said movable mount and consequently the direction of the light beam projected from said light-beam projection means can be varied accordingly.

8. An image focusing device of claim 6 wherein said lens-group displacement detection means comprises: (a) a movable mount upon which is mounted or to which is operatively coupled said reflecting mirror and which is disposed in an inner barrel of said photographic lens in which is mounted a lens group and which is movable along the optical axis of the photographic lens, said movable mount being angularly movable in the plane containing the optical axis of said photographic lens, whereby the direction of the light beam projected from said light-beam projection means relative to the optical axis thereof can be varied; (b) a sensing pin which is disposed within said inner barrel for movement in a direction in parallel with the optical axis thereof so as to detect the axial displacement of said inner barrel, one end of said sensing pin being in contact with a focusing ring of said photographic lens which controls the axial displacement of said inner barrel while a curved surface of said sensing pin is in contact with a predetermined portion of said movable mount; (c) a first biasing means for maintaining the contact between said predetermined portion of said movable mount and the curved surface of said sensing pin; and (d) a second biasing means for maintaining the contact between the sensing pin and the focusing ring, whereby the axial displacement of said sensing pin in response to the axial displacement of said inner barrel causes angular displacement of said movable mount and changes the direction of the light beam projected from said light-beam projection means.

* * * * *